April 24, 1956 J. HODGE 2,742,760
GAS TURBINE POWER PLANTS
Filed June 2, 1953 3 Sheets-Sheet 1
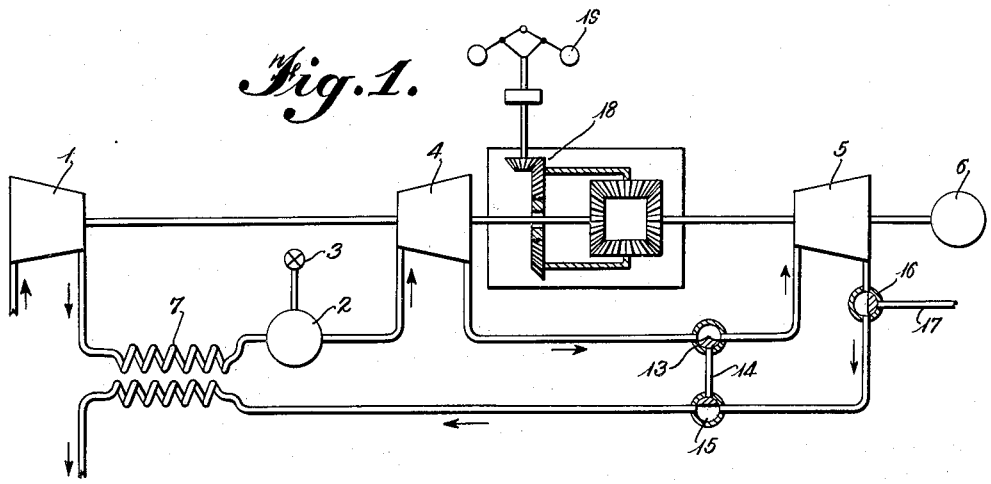
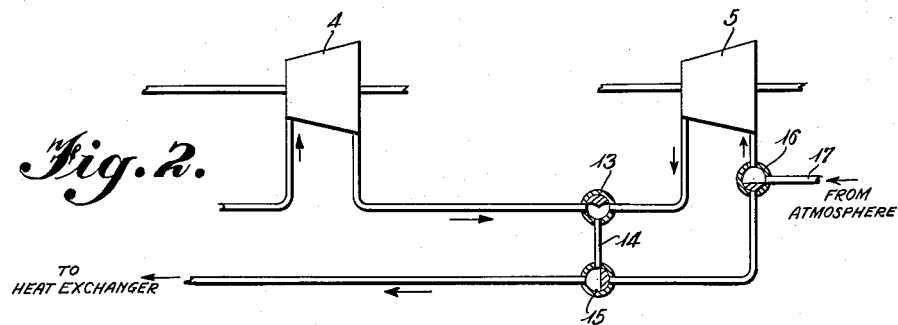
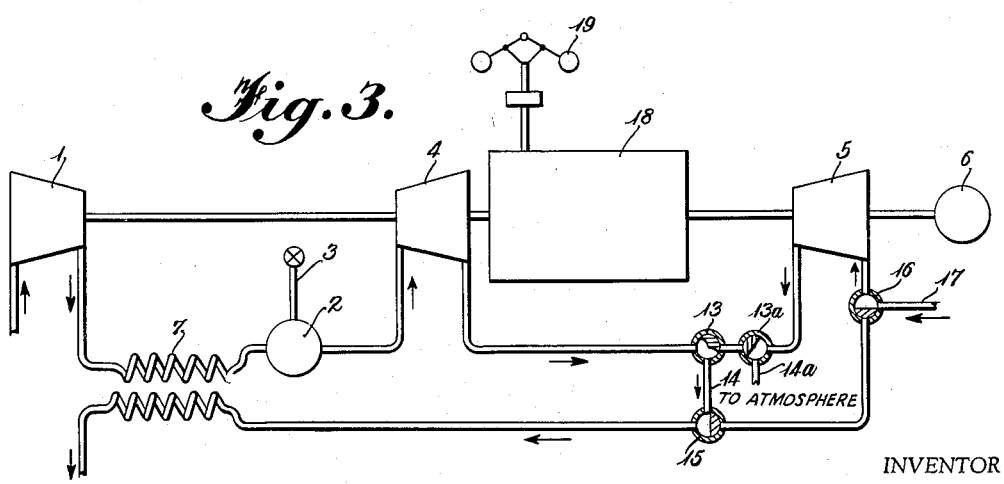
INVENTOR
*James Hodge*
BY *Stevens, Davis, Miller and Mosher*
ATTORNEYS April 24, 1956
J. HODGE
2,742,760
GAS TURBINE POWER PLANTS
Filed June 2, 1953
3 Sheets-Sheet 2
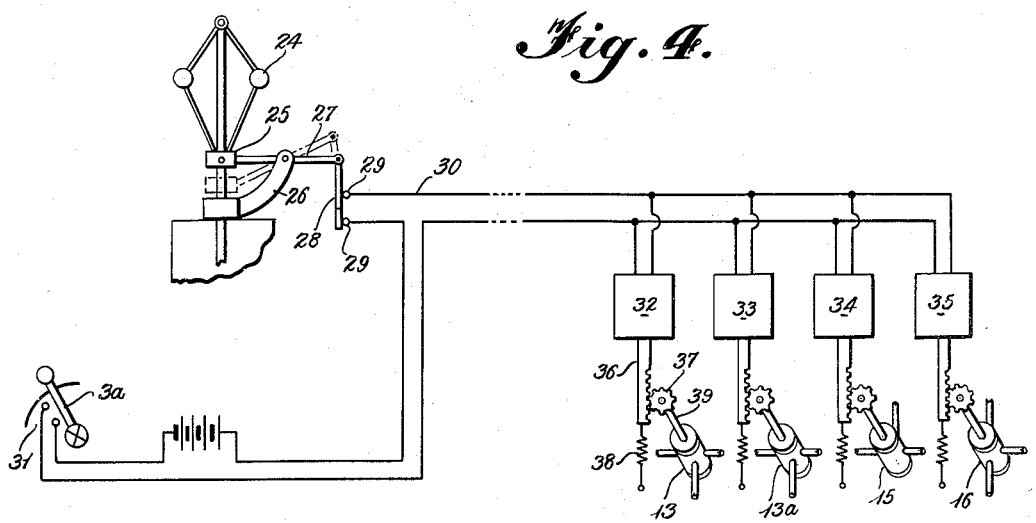
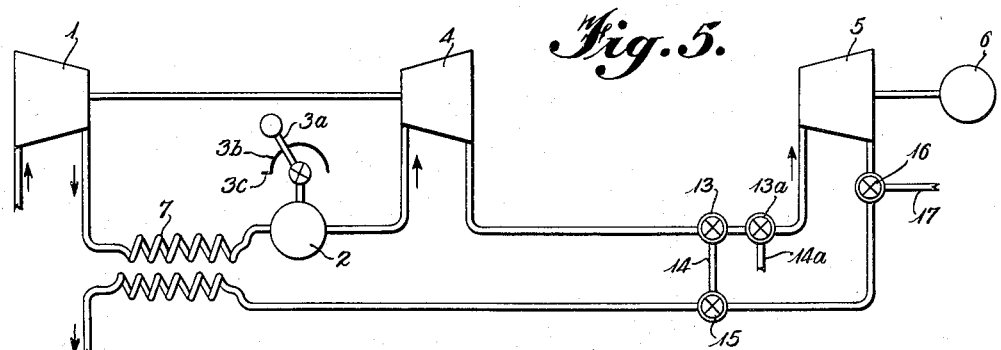
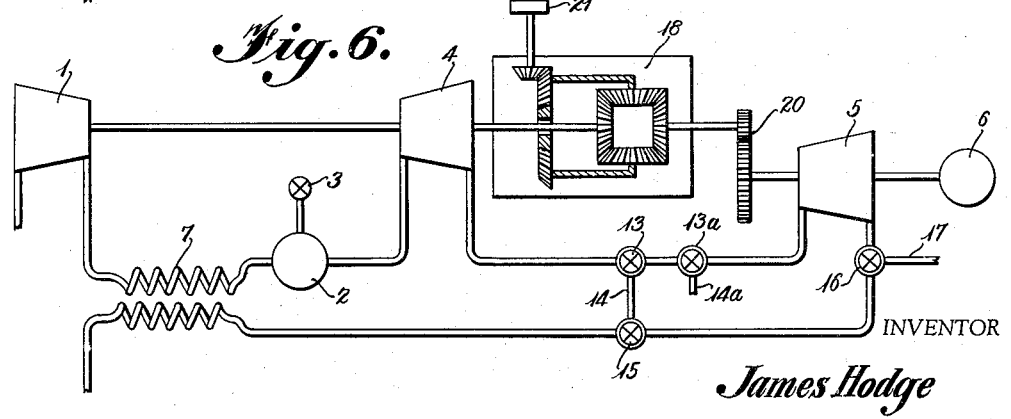
INVENTOR
James Hodge
BY Stevens, Davis, Miller and Mosher
ATTORNEYS April 24, 1956  J. HODGE  2,742,760
GAS TURBINE POWER PLANTS Filed June 2, 1953  3 Sheets-Sheet 3

INVENTOR
*James Hodge*
BY *Stevens, Davis, Miller and Mosher*
ATTORNEYS

United States Patent Office 2,742,760
Patented Apr. 24, 1956

2,742,760
GAS TURBINE POWER PLANTS

James Hodge, Farnborough, England, assignor to Power Jets (Research & Development) Limited, London, England, a British company Application June 2, 1953, Serial No. 359,139

Claims priority, application Great Britain March 30, 1949

7 Claims. (Cl. 60—39.16)

This invention relates to gas turbine power plants and is a continuation-in-part of application Serial No. 150,631 filed March 20, 1950 now abandoned. This type of gas turbine power plant includes a gas generating set (comprising a compressor, a combustion system, and a compressor-driving turbine) and an independently rotatable turbine for delivering external shaft power. It finds its primary utility in vehicle-propulsion.

As is well known, it is of advantage if the prime mover of a land vehicle is adapted, when throttled back, to provide a "braking" effect which tends to check the momentum of the vehicle, especially on down gradients. Gas turbine plants of the kind referred to usually have the disadvantage that they are not capable of providing such a braking effect, since the power turbine is running free and does not drive a compressor.

The present invention is based upon a realisation of the fact that a turbine of the radial vane centripetal flow type is capable, when over-driven by a machine which it normally drives, of performing sufficient work on the working fluid (the direction of which is then reversed from centripetal to centrifugal) to provide a useful braking effect.

An object of the present invention is therefore to provide an open-cycle gas turbine power plant of the kind referred to above having an independent radial-vane centripetal flow power turbine, through which, when the power turbine is over-driven, the working fluid flows in a reverse direction thereby causing the power turbine to perform work on the cooling fluid to provide a braking effect.

In this specification the expression "radial-vane" is used to include the cases of vanes which are "backswept" or "forward swept" from the truly radial alignment; and the expression "centripetal" includes cases (such as the so-called "mixed flow" or "diagonal flow" turbines) in which the flow through the rotor channels is made up of a radial and an axial component.

For the sake of example, certain embodiments of the invention will now be described in greater detail with reference to the accompanying drawings in which:

Figure 1 is a diagrammatic representation of the valve network of a gas turbine power plant during normal land vehicle propulsion, the flow path of the working fluid in the various ducts being shown by arrowed lines;

Figure 2 is a diagrammatic representation of the valve network of Figure 1 during idling operation conditions when the load may overrun the turbine, parts being removed for convenience of illustration;

Figure 3 is a diagrammatic representation of a gas turbine power plant during idling operation which shows a modification of the Figure 1 network;

Figure 4 is a diagrammatic representation of one form of mechanism suitable for operating the valve systems of Figures 1, 2 and 3;

Figure 5 is a diagrammatic representation of a simpler system, alternative to that of Figure 3;

Figure 6 is a diagram of a system similar to that of Figure 3 but involving a reversing gear between the power turbine and the differential system;

Figure 7:
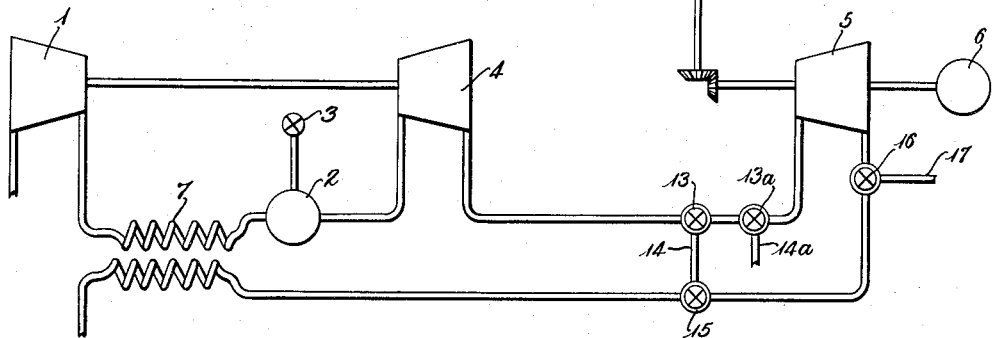
Figure 7 is a diagrammatic representation of a system in which the controlling governor is driven directly by the power turbine.

The layout in Figure 1 comprises a compressor 1, a combustion chamber 2 the delivery of fuel for combustion in which is controllable by a throttle valve 3; a compressor-driving turbine 4, and a power turbine 5 which is rotatable independently of the turbine 4 and which is coupled to the propelling wheels of the vehicle as represented diagrammatically by numeral 6. When the gas turbine power plant is operating normally, i. e., when the throttle 3 is open, the gases from turbine 4 pass through the valve 13 to the power turbine 5 and then through valves 16 and 15 to exhaust, through heat exchanger 7 as shown by the arrows in Figure 1. During this normal operation, valves 13 and 15 close off the bypass line 14 and valve 16 closes off a line 17 leading to atmosphere. The exhaust from the turbine 5 is led through the heat exchanger 7 to heat the compressed air before it reaches the combustion chamber 2.

It is necessary to provide means (operative when the turbine 5 is overdriven) for diverting the flow of working fluid coming from the turbine 4 and reconnecting such flow to the exhaust ducting downstream of the turbine 5. It is also desirable to provide means for relieving at a suitable rate the fluid coming from the turbine 5 when it is overdriven. These dual functions are fulfilled by a combination of valve 13, the ducting 14 and the valve 15. The valves 13 and 15, when turned to the Figure 2 position, serve both to connect the exhaust of the turbine 4 to the by-pass line 14, and to allow the fluid from the turbine 5 to be relieved into that line.

The intake duct or line 17 is provided in order to prevent the turbine 5 sucking back hot working fluid when overdriven and, when valve 16 is in the Figure 2 position, the turbine 5 is able to suck in a supply of fresh air from the atmosphere.

Summarizing the showing of Figure 2, when the turbine 5 is overdriven and the throttle valve 3 is closed to the idling position, the exhaust gases from turbine 4 pass through the valve 13, the by-pass 14 and the valve 15 to exhaust and air is taken into the power turbine 5 through the duct 17 and is delivered into duct 14 also through valve 13. During this idling operation valve 13 is open to the exhaust from turbine 4 and to by-pass 14. In the same position it connects the exhaust of the now reversed turbine 5 to the by-pass 14. The intake of the reversed or overdriven turbine 5 flows through intake duct 17 and valve 16.

Instead of the arrangement of Figures 1 and 2, there may be two separate valves, 13 and 13a of which the former connects the exhaust of the turbine 4 to the by-pass 14, and the latter (13a) merely allows the relief direct to the atmosphere of fluid from the turbine 5 when that turbine overruns its load. This construction is shown in Figure 3. Under normal operating conditions valves 13 and 13a are both in the same position as valve 13 of Figure 1 so as to open the passage between turbines 4 and 5 and close by-pass 14 and vent line 14a to atmosphere. Other parts are in the same position as in Figure 1.

When the turbine 5 is overdriven and the throttle valve 3 is closed to the idling position the valves 13, 13a, 15 and 16 are moved to the positions of Figure 3. In the Figure 3 position of these valves, turbine 4 is exhausted through valve 13 and by-pass 14 while the reversed or overrun turbine 5 exhausts to atomsphere through valve 13a and vent line 14a.

While the valves 13, 15 and 16 may be adjusted manually between the Figure 1 and Figure 2 positions by the vehicle operator and while this is equally true where valve 13a is employed, it is desirable to make the adjustments automatically in response to the conditions of operation encountered by the vehicle. To this end the turbines 4 and 5 of Figures 1 and 3 are interconnected by a differential gear indicated generally by 18. The gearing which forms the rotary "cage" of the differential drives a speed governor 19. Movement of the governor 19 in response to rotational speed changes is transmitted by an appropriate control-linkage or other mechanism to move the valves 13, 15, 16 (and 13a if present) simultaneously from the normal operating position to the idling position or vice versa.

It will be understood that the greater the difference in speed between the turbines 4 and 5, the greater the speed of the differential "cage" and hence of the governor 19, the mechanism of which is so contrived that if the speed of the turbine 5 has attained a predetermined limit, while the turbine 4 is idling, the action of the governor 19 operates the valves 13, 15, 16 (and 13a when present) so that communication is opened between the turbine 5 and the fresh air intake 17, and the exhaust from the turbine 4 is shut off from the intake which normally leads it to the turbine 5 and is allowed to enter the by-pass duct 14 from which it re-enters the exhaust ducting downstream of the turbine 5 by way of the valve 15 which also operates to prevent such exhaust travelling upstream. The fluid coming from the turbine 5 while overdriven is either relieved into the by-pass 14 via the valve system 13 or is relieved directly to atmosphere through the separate valve 13a.

In order to ensure that the valves 13, 13a, 15, 16 are only operated as above described when the throttle 3 is closed to idling position an appropriate interlock connection is provided between the throttle 3 and the governor 19.

Figure 4 applying more specifically to Figure 3 shows an electrically controlled circuit and an associated mechanism for operating valves 13, 13a, 15 and 16 in response to the speed of the governor. Although Figure 4 includes mechanism for operating both valves 13 and 13a it should be understood that this mechanism can be applied equally well to Figure 1. In Figure 4, the governor is designated by numeral 24. In response to changes of speed of governor 24 sleeve 25 is caused to move vertically. This vertical movement pivots an arm 27 on a bracket 26 mounted on the casing of differential gears 18. An arm 28 carried on the free end of arm 27 "makes" and "breaks" a pair of contacts 29 of an electrical circuit 30. In the position shown by full lines in Figure 4 the circuit 30 is completed at contacts 29 and in the position shown by broken lines in Figure 4 the arm 28 has moved away from contacts 29, thereby breaking circuit 30. In series with contacts 29 there is also a pair of contacts 31 adjacent the throttle control 3a. When the throttle control 3a is at its idling setting 3b the contacts 31 are electrically joined by the arm of the throttle control. Also in the circuit 30 there are four solenoids 32, 33, 34, 35 connected in parallel with each other and provided with a mechanism for operating valves 13, 13a, 15 and 16, respectively. The operating mechanism for each valve comprises a plunger 36 passing through the solenoid and urged away therefrom by a spring 38, and a gear wheel 37, engaging a toothed rack portion of the plunger 36. The gear wheel 37 is connected by a shaft 39 to the rotatable part of the valve.

The operation of the control circuit and the associated mechanism is as follows: throttle control lever 3a is moved to the idling position 3b, thereby connecting the pair of contacts 31. As the difference in speed between turbines 4 and 5 increases the speed of governor 24 increases. This causes the sleeve 25 to move vertically upward into the position shown by the full lines in Figure 4 thereby joining the pair of contacts 29. The electrical circuit 30 is now completed and the solenoids 32, 33, 34, 35 will cause the plungers 36 to be withdrawn into the solenoids against the action of springs 38, thereby rotating the gear wheel 37 and hence operating the valves 13, 13a, 15 and 16.

Although Figure 4 shows by way of illustration an electrically controlled circuit and an associated mechanism for operating valves 13, 13a, 15 and 16 it should be understood that manual and mechanical operation of these valves is included within the purview of this invention.

In an alternative system according to Figure 5, there is no differential gear and the valves actuation is initiated solely by moving the throttle control 3a past an idling stop 3b to a further setting 3c. If this were applied to Figure 4 parts 24 to 29 would be eliminated and the circuit would be closed by the 3c setting of the throttle.

Another alternative in which a governor is dispensed with is indicated in Figure 6. In this suitable gearing 20 is introduced between the power turbine 5 and the differential 18, and the valve made to open simply by the fact of the differential cage turning at all (in a particular direction), provided that the turbine 4 is idling. Detection of the correct directional rotation and of the appropriate throttle setting is performed by the controlling means indicated at 21. The means 21 may conveniently be a simple overrunning clutch that is driven only when the direction is correct for moving the valves to the idling position. The clutch may operate a switch like switch 28—29 of Figure 4 and the throttle may be wired as shown in Figure 4.

A further alternative, in which a differential gear is dispensed with is shown in Figure 7. In this a governor 22 is driven by the turbine 5 and is arranged to operate the valves (so long as the throttle is in idling position). This again may be connected to the valves as shown in Figure 4.

Figure 8:
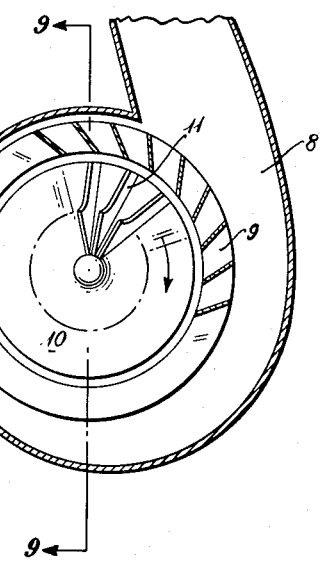
Figure 8 is a front view showing the construction of the power turbine 4 of the type used in the system illustrated in Figures 1–7 inclusive.
Figure 9:
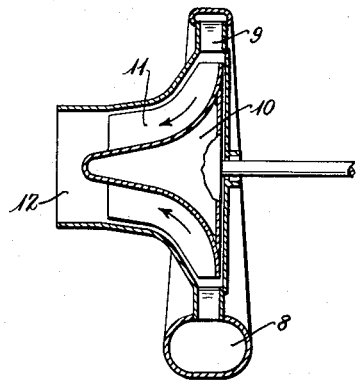
Figure 9 is a view in section of the power turbine of Figure 8 taken along line 9—9.

At least the power turbine 5 is of the radial-vane centripetal flow type as illustrated by Figures 8 and 9 from which it will be seen that the power turbine comprises a casing to which the hot gas is supplied tangentially by way of a volute 8 to the ring of nozzle vanes 9 which guide it on to the substantially radial vanes 11 carried by the rotor body 10. The gas passes through the vane channels of the rotor in a generally centripetal direction and emerges by way of an axially disposed outlet duct 12.

If it is supposed that the throttle valve 3 is closed to the idling position and the momentum of the vehicle is increased due to its being on a down gradient, the rotor of the power turbine 5 will be over-driven by the momentum of the vehicle and will inspire fluid through the duct 12, perform work on such fluid, and deliver it centrifugally outwards through the vanes 9 into the volute 8. There is probably some compression of the fluid in the turbine 5, but, in any case, the work done on the fluid is sufficient to provide a useful absorption of momentum.

What is claimed is:

1. An open-cycle gas turbine plant comprising a compressor, a combustion system, a compressor-driving turbine, an independent radial-vane centripetal flow power turbine, an intake duct, an exhaust duct, a fluid path from the intake duct through said compressor, combustion system and said turbines to the exhaust duct, a first valve arrangement in said fluid path operable to relieve said power turbine of working fluid, a second valve arrangement in said fluid path operable to permit reversal of the direction of fluid flow through said power turbine, a throttle by means of which fuel delivery to the combustion system is regulated, a valve controlling means, an interlock between said throttle and said controlling means preventing the operation of said controlling means except when the throttle is closed at least to a predetermined extent and means responsive to the operation of said valve controlling means to operate both of said valve arrangements.

2. An open-cycle gas turbine plant comprising a compressor, a combustion system, a compressor-driving turbine, an independent radial-vane centripetal flow power turbine, an intake duct, an exhaust duct, a fluid path from the intake duct through said compressor, combustion system and said turbines to the exhaust duct, a first valve arrangement in said fluid path operable to permit reversal of the direction of fluid flow through said power turbine, a throttle by means of which fuel delivery to the combustion system is regulated, a valve controlling means, an interlock between said throttle and said controlling means preventing the operation of said controlling means except when the throttle is closed at least to a predetermined extent, means responsive to the operation of said valve controlling means to operate both of said valve arrangements, and means responsive to overdriving of said power turbine by its load to actuate said valve controlling means when said interlock is in a permissive condition.

3. A gas turbine plant as claimed in claim 2 in which said overdriving responsive means comprises a differential gear connected between the compressor-driving and power turbines and a governor driven by said differential gear at a speed dependent on the difference in speed of the two turbines and arranged at a predetermined speed to cause said operation of said valve controlling means.

4. A gas turbine plant as claimed in claim 2 in which said overdriving responsive means comprises a governor driven by said power turbine and arranged at a predetermined speed to cause said operation of said valve controlling means.

5. A gas turbine plant as claimed in claim 2 in which said overdriving responsive means comprises a differential gear, a first drive from the compressor-driving turbine to said differential gear, a second drive from the power turbine to said differential gear, gearing in one of said drives and a connection from said differential gear to said valve controlling means and which valve controlling means is operable only in response to one direction of resultant motion of said differential gear.

6. An open-cycle gas turbine plant comprising a compressor, a combustion system, a compressor-driving turbine, an independent radial vane centripetal flow power turbine, an intake duct, an exhaust duct, a fluid path from the intake duct through the compressor, combustion system and said turbines to the exhaust duct, a first valve arrangement operable to relieve the power turbine of working fluid, a by-pass duct between a position in said fluid path upstream of the power turbine and the exhaust duct through which said relieved working fluid is passed by said first valve arrangement, a second valve arrangement operable to permit reversal of the direction of fluid flow through said power turbine, a connection downstream of said power turbine to a low pressure fluid supply through which said reversed fluid flow is allowed to pass by operation of said second valve arrangement, a throttle by means of which fuel delivery to the combustion system is regulated, a valve controlling means, an interlock between said throttle and said controlling means preventing the operation of said controlling means except when the throttle is closed at least to a predetermined extent and means responsive to the operation of said valve controlling means to operate both of said valve arrangements.

7. An open-cycle gas turbine plant comprising a compressor, a combustion system, a compressor-driving turbine, an independent radial-vane centripetal flow power turbine, an intake duct, an exhaust duct, a fluid path from the intake duct through the compressor, combustion system and said turbines to the exhaust duct, a relief valve in the fluid path between the two turbines, a stop valve in the exhaust duct, a by-pass duct between the relief and stop valves, an atmospheric air supply valve between the power turbine and said stop valve, an air outlet valve between said power turbine and said relief valve, a throttle by means of which fuel delivery to the combustion system is regulated, a valve controlling means, an interlock between said throttle and said controlling means preventing the operation of said controlling means except when the throttle is closed at least to a predetermined extent and means responsive to the operation of the valve controlling means to change over said valves from the condition in which working fluid passes directly through said fluid path to the condition in which the working fluid is relieved via the relief and stop valves to the exhaust duct directly from the compressor-driving turbine and in which atmospheric air is inspired through the air supply valve and is delivered through said power turbine in a reversed flow direction to said air outlet valve.

References Cited in the file of this patent

UNITED STATES PATENTS

| | | |
|---|---|---|
| 2,336,052 | Anderson et al. | Dec. 7, 1943 |
| 2,591,540 | Grylls | Apr. 1, 1952 |
| 2,627,717 | Waller | Feb. 10, 1953 |
| 2,660,033 | Bowden et al. | Nov. 24, 1953 |